United States Patent
Agrawal et al.

(10) Patent No.: US 8,200,719 B2
(45) Date of Patent: Jun. 12, 2012

(54) SYSTEM AND METHOD FOR PERFORMING A FILE SYSTEM OPERATION ON A SPECIFIED STORAGE TIER

(75) Inventors: Mukund Satish Agrawal, Pune (IN); Aalop Suresh Shah, Pune (IN); Dilip Madhusudan Ranade, Pune (IN)

(73) Assignee: Symantec Corporation, Mountain View, CA (US)

( * ) Notice: Subject to any disclaimer, the term of this patent is extended or adjusted under 35 U.S.C. 154(b) by 406 days.

(21) Appl. No.: 11/853,121

(22) Filed: Sep. 11, 2007

(65) Prior Publication Data
US 2009/0070382 A1    Mar. 12, 2009

(51) Int. Cl.
G06F 7/00    (2006.01)
(52) U.S. Cl. ...................................................... 707/821
(58) Field of Classification Search .................. 707/200, 707/828, 821
See application file for complete search history.

(56) References Cited

U.S. PATENT DOCUMENTS

| | | | |
|---|---|---|---|
| 7,149,729 B2 | 12/2006 | Kaasten | |
| 7,409,644 B2 | 8/2008 | Moore | |
| 2005/0044075 A1* | 2/2005 | Steere et al. | 707/4 |
| 2006/0117049 A1 | 6/2006 | Jain et al. | |
| 2007/0185934 A1* | 8/2007 | Cannon et al. | 707/204 |
| 2008/0104081 A1* | 5/2008 | Mimatsu | 707/10 |

FOREIGN PATENT DOCUMENTS

| | | |
|---|---|---|
| GB | 2403316 | 12/2004 |
| WO | 2005124597 | 12/2005 |

OTHER PUBLICATIONS

"Using Dynamic Storage Tiering," Karche et al., Apr. 2006, http://eval.symantec.com/mktginfo/enterprise/yellowbooks/dynamic_storage_tiering_03_2006.en-us.pdf.
"File Systems in Unix," Norman Matloff, Oct. 19, 1998, http://heather.cs.ucdavis.edu/~matloff/UnixAndC/Unix/FileSyst.pdf.
Search Report issued for EP application No. 08163989.0 dated Dec. 12, 2008.
Chinese Office Action dated Nov. 2, 2011 in Chinese App. No. 200810176983.9; 4 pages.
English translation of Chinese Office Action dated Nov. 2, 2011 in Chinese App. No. 200810176983.9; 6 pages.

* cited by examiner

*Primary Examiner* — Jensen Hu
(74) *Attorney, Agent, or Firm* — Meyertons, Hood, Kivlin, Kowert & Goetzel, P.C.

(57) ABSTRACT

Various embodiments of a system and method for performing a file system operation on a specified storage tier are disclosed. Input specifying a file system operation and a pathname may be received. The pathname may include a plurality of components, including one or more directory components and a storage tier component. The pathname may be analyzed to determine a directory specified by the one or more directory components and a storage tier specified by the storage tier component. The file system operation may be performed, where the file system operation operates on the first directory and the first storage tier. In a further embodiment, the components of the pathname may also include a filename component. Thus, the pathname may be further analyzed to determine a filename specified by the filename component. The file system operation may operate on the first filename, the first directory, and the first storage tier.

19 Claims, 11 Drawing Sheets

SYSTEM AND METHOD FOR PERFORMING A FILE SYSTEM OPERATION ON A SPECIFIED STORAGE TIER

BACKGROUND OF THE INVENTION

1. Field of the Invention

This invention relates to computer file systems. More particularly, the invention relates to a system and method for performing a file system operation on a specified storage tier.

2. Description of the Related Art

Large businesses and other organizations often store a vast amount of computer data of various types, ranging from critical data required to run the business, to emails kept according to regulations, to derived or historical information for trend analysis, etc. A variety of different types of storage devices exist for storing these vast quantities of data, such as various types of optical storage devices, disk drive devices, tape drive devices, etc.

Different types of storage devices have different performance, reliability, and recoverability characteristics. Different types of storage devices can also vary greatly in their cost. High-end storage devices can be more expensive than low-end storage devices by an order of magnitude or even more. As a result, organizations often store different types of data on different types of storage devices. For example, the most important data may be stored on high-end storage devices while less important data is stored on lower-end storage devices.

To accomplish this, the organization may organize storage devices or other storage units into multiple storage tiers, also referred to herein as storage classes. Each storage unit may be assigned to one of the storage tiers. The storage devices or other storage units may be grouped into the storage tiers according to various criteria. For example, in some systems, different storage tiers may represent storage devices having different characteristics, such as I/O performance, cost, reliability, recoverability, data availability, etc. Storage devices with similar characteristics may be assigned to the same storage tier as each other.

As one example, an organization may define three different storage tiers, such as a high-end storage tier, mid-range storage tier, and low-end storage tier. High-end storage devices, such as high-end disk arrays with remote mirroring and frequent point-in-time snapshot capabilities, may be assigned to the high-end storage tier. Mid-range storage devices, such as mid-range disk arrays with less frequent point-in-time snapshots and without remote mirroring, may be assigned to the mid-range storage tier. Low-end storage devices, such as inexpensive disks managed by software or firmware RAID, may be assigned to the low-end storage tier. Different types of data may be stored on storage devices in different storage tiers. For example, the most important data may be stored on storage devices in the high-end storage tier, while the least important data may be stored on storage devices in the low-end storage tier.

The data stored on the various storage devices is typically organized into files managed by one or more file systems. The data may be assigned to different storage tiers at the file level. In other words, each file may be assigned to a storage tier, where different files can be assigned to different storage tiers. Thus, in the example above, the files considered to be most important may be assigned to the high-end storage tier, while the files considered to be least important may be assigned to the low-end storage tier.

SUMMARY

Various embodiments of a system and method for performing a file system operation on a specified storage tier are disclosed herein. According to one embodiment of the method, input specifying a file system operation and a pathname may be received. The pathname may comprise a character string including a plurality of components. The components may include one or more directory components and a storage tier component. The character string may be analyzed to determine a directory specified by the one or more directory components and a storage tier specified by the storage tier component. The file system operation may be performed, where the file system operation operates on the first directory and the first storage tier.

In a further embodiment of the method, the components of the character string of the pathname may also include a filename component. Thus, the character string may be further analyzed to determine a filename specified by the filename component. The file system operation may operate on the first filename, the first directory, and the first storage tier.

BRIEF DESCRIPTION OF THE DRAWINGS

A better understanding of the invention can be obtained when the following detailed description is considered in conjunction with the following drawings, in which.

Figure 1:
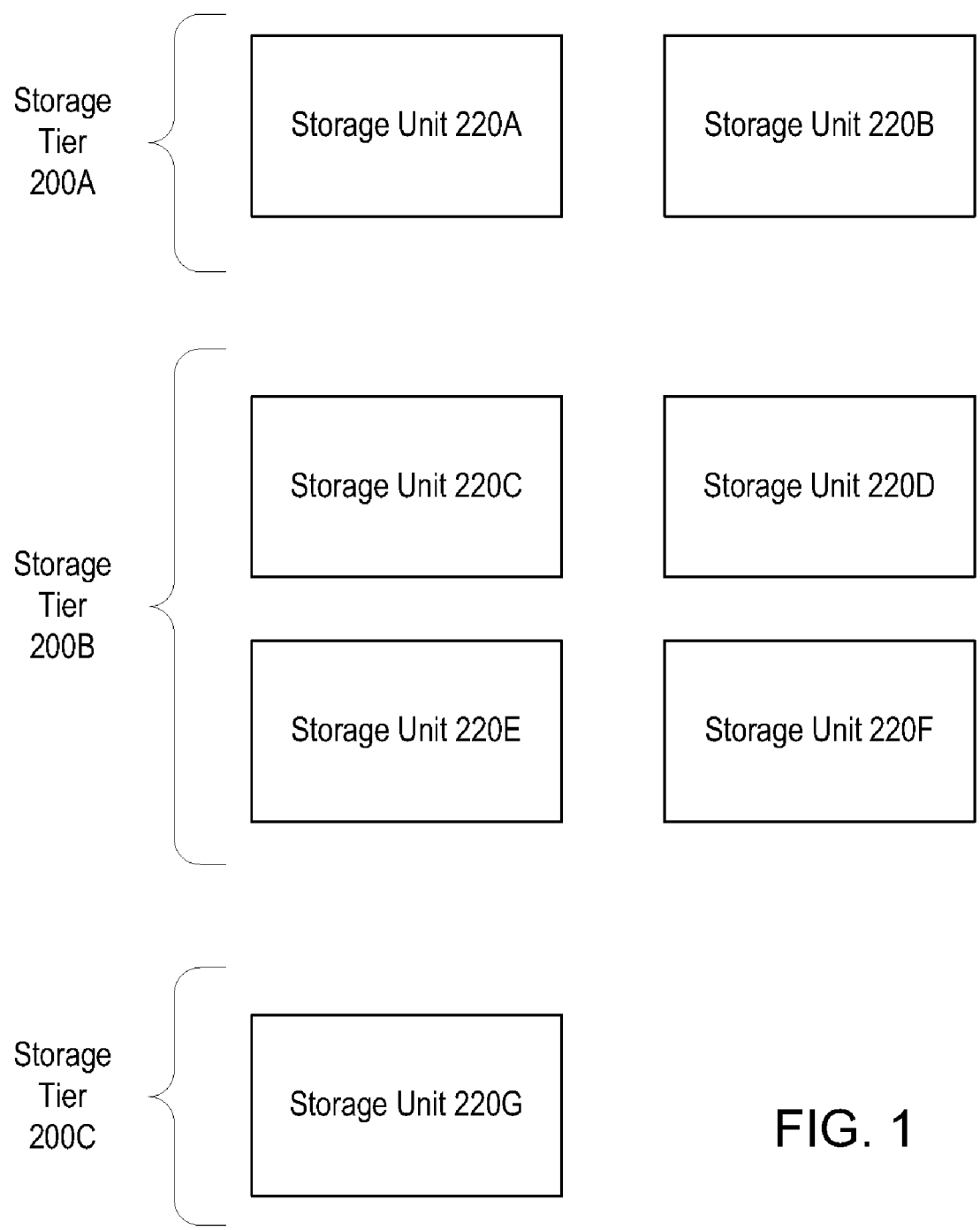
FIG. 1 illustrates an example in which three storage tiers have been defined.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for performing a file system operation on a specified storage tier are disclosed herein. The system may utilize a plurality of storage units. As used herein, the term "storage unit" refers to a storage device or a volume. A storage device is a device operable to store data. A volume is a logical partitioning and/or aggregation of physical storage provided by one or more storage devices. A volume may be formed from a subset (e.g., less than all) of the overall storage of a storage device, all of the storage of a storage device, or from the storage of multiple storage devices combined.

The system may also define and utilize a plurality of storage tiers, where each storage tier is a class or category representing a set of one or more storage units. In some embodiments, each storage unit may be assigned to one and only one of the storage tiers. In other embodiments, one or more of the storage units may be assigned to more than one storage tier.

In various embodiments the storage units may be grouped into the storage tiers according to any of various criteria. For example, in some embodiments, different storage tiers may represent storage devices having different characteristics, such as I/O performance, cost, reliability, recoverability, data availability, etc. Storage devices with similar characteristics may be assigned to the same storage tier as each other.

FIG. 1 illustrates an example in which three storage tiers 200A, 200B, and 200C have been defined. The storage units 220A and 220B are assigned to the storage tier 200A. The storage units 220C, 220D, 220E, and 220F are assigned to the storage tier 200B. The storage unit 220G is assigned to the storage tier 200C. In some embodiments each respective storage tier may be given a name or identifier that uniquely identifies the respective storage tier. For example, the storage tier 200A may have a name, such as "tier_A"; the storage tier 200B may have a name, such as "tier_B"; and the storage tier 200C may have a name, such as "tier_C".

In some embodiments the storage tiers 200A-C may represent groupings of storage devices. For example, the storage units 220A and 220B may be respective storage devices that have similar characteristics as each other. The storage units 220C, 220D, 220E, and 220F may be respective storage devices that have similar characteristics as each other, but may differ in their characteristics from the storage devices represented by the storage units 220A and 220B. Similarly, the storage unit 220G may be a storage device that differs in its characteristics from the other storage devices.

In other embodiments the storage tiers 200A-C may represent groupings of volumes. For example, the storage units 220A and 220B of storage tier 200A may be respective volumes that have similar characteristics as each other. For example, the respective volumes may be implemented from storage on the same storage device or may be implemented from storage of different storage devices that have similar characteristics as each other. Similarly, the storage units 220C, 220D, 220E, and 220F of storage tier 200B may be respective volumes that have similar characteristics as each other. The storage unit 220G of storage tier 200C may be a volume that differs in its characteristics from the volumes of the storage tiers 200A and 200B.

The system may implement one or more file systems in which the data stored in the storage units 220 is organized as a plurality of files. For each respective file in at least a subset of the files, the respective file may be assigned to a storage tier, where different files can be assigned to different storage tiers. In various embodiments, the files may be assigned to storage tiers on the basis of any of various criteria. In some embodiments each file may be treated as having an importance level or business value, and the files may be assigned to storage tiers based on their respective importance levels, e.g., where each storage tier represents an importance level or range of importance levels. As another example, each file may be of a respective file type (e.g., documents, tables of transaction records, images, audio tracks, or other types of objects or entities), and the files may be assigned to storage tiers based on their respective file types. Other criteria that may be used in deciding which storage tier a file is assigned to include the owner of the file, which software applications use the file, an I/O pattern in which the file is accessed, etc.

The storage tier assignments for the various files may be used to select the storage units 200 in which to store the files. For example, if a file is assigned to the storage tier 200A then the system may select either the storage unit 220A or the storage unit 220B to store the file. In some embodiments, one or more files may not be assigned to any storage tier. For these files, the system may select any storage unit 220 to store the files. Also, in some embodiments, if none of the storage units corresponding to the storage tier to which a given file is assigned is available (e.g., if all of the storage units in the storage tier are out of space or offline) then a storage unit in another storage tier may be selected to store the file.

Figure 2:
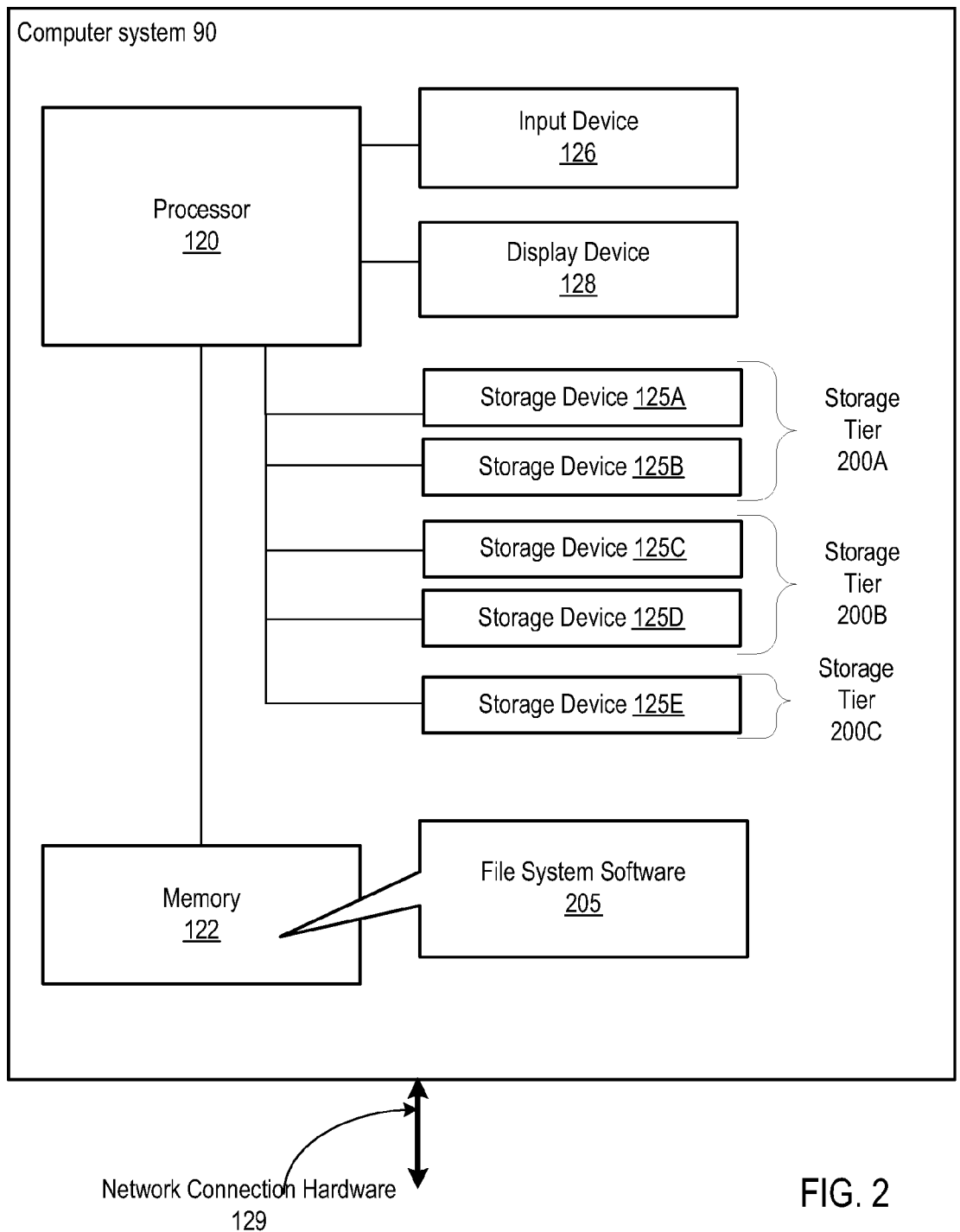
FIG. 2 illustrates an example embodiment of a computer system operable to implement a method for performing a file system operation on a specified storage tier.

FIG. 2 illustrates an example embodiment of a computer system 90 operable to implement the method described herein for performing a file system operation on a specified storage tier. In various embodiments the computer system 90 may comprise any type of computer system.

In the example of FIG. 2, the computer system 90 includes a plurality of storage devices 125, where each storage device 125 is assigned to a storage tier 200 (e.g., storage tier 200A, 200B, or 200C in this example). Thus, in this example, the storage tiers 200 represent groupings of storage devices 125. In particular, the storage devices 125A and 125B are assigned to the storage tier 200A, the storage devices 125C and 125D are assigned to the storage tier 200B, and the storage device 125E is assigned to the storage tier 200C.

In various embodiments, any number of storage devices 125 may be present. Also, any number of storage tiers 200 may be defined, and the storage devices 125 may be assigned to the storage tiers 200 according to any desired criteria.

Each storage device 125 may comprise a storage device of any type and may store files on any kind of medium or media. Examples of storage devices 125 include devices that include one or more optical storage devices, devices that include one or more disk drives, devices that include one or more tape drives, devices that include one or more flash memory devices, etc. As one example, a particular storage device 125 may be implemented as one or more disk drives configured independently or as a disk storage system.

The computer system 90 may also include one or more processors 120. The processors 120 may be coupled to the storage devices 125 in any of various ways, such as through a communication bus, wired or wireless network, cable connection, etc. Each of the one or more processors 120 may comprise any type of processor. For example, in some embodiments, a processor 120 may be compatible with the x86 architecture, while in other embodiments a processor 120 may be compatible with the SPARC™ family of processors.

The computer system 90 may also include memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition. The memory 122 may be store program instructions and/or data. In particular, the memory 122 may store file system software 205, as well as possibly storing other software for operation of the computer system, such as operating system software, network communication software, etc. The one or more processors 120 may execute the file system software 205 to implement one or more file systems which manage files stored on the storage devices 125. The file system software 205 may also be executable to perform the method described herein for performing a file system operation on a specified storage tier. Various embodiments of the method are described in detail below.

The computer system 90 may also include one or more input devices 126 for receiving user input. The input device(s) 126 may include any of various types of input devices, such as keyboards, keypads, microphones, or pointing devices (e.g., a mouse or trackball). The computer system 90 may also include one or more display devices 128 or other output devices for displaying output to the user. For example, the one or more display devices 128 may include any of various types of devices for displaying information, such as LCD screens or monitors, CRT monitors, etc.

The computer system 90 may also include network connection hardware 129 through which the computer system 90 connects to one or more networks. The network connection hardware 129 may include any type of hardware for coupling the computer system 90 to the network(s), e.g., depending on the type of network.

In various embodiments the computer system 90 may be coupled to any type of network or combination of networks. For example, the computer system 90 may be coupled to one or more of a local area network (LAN), a wide area network (WAN), a wireless network, an Intranet, the Internet, etc. Exemplary local area networks include Ethernet networks, Fiber Distributed Data Interface (FDDI) networks, and token ring networks. The computer system 90 may be coupled to one or more networks using any type of wired or wireless connection mediums. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 3:
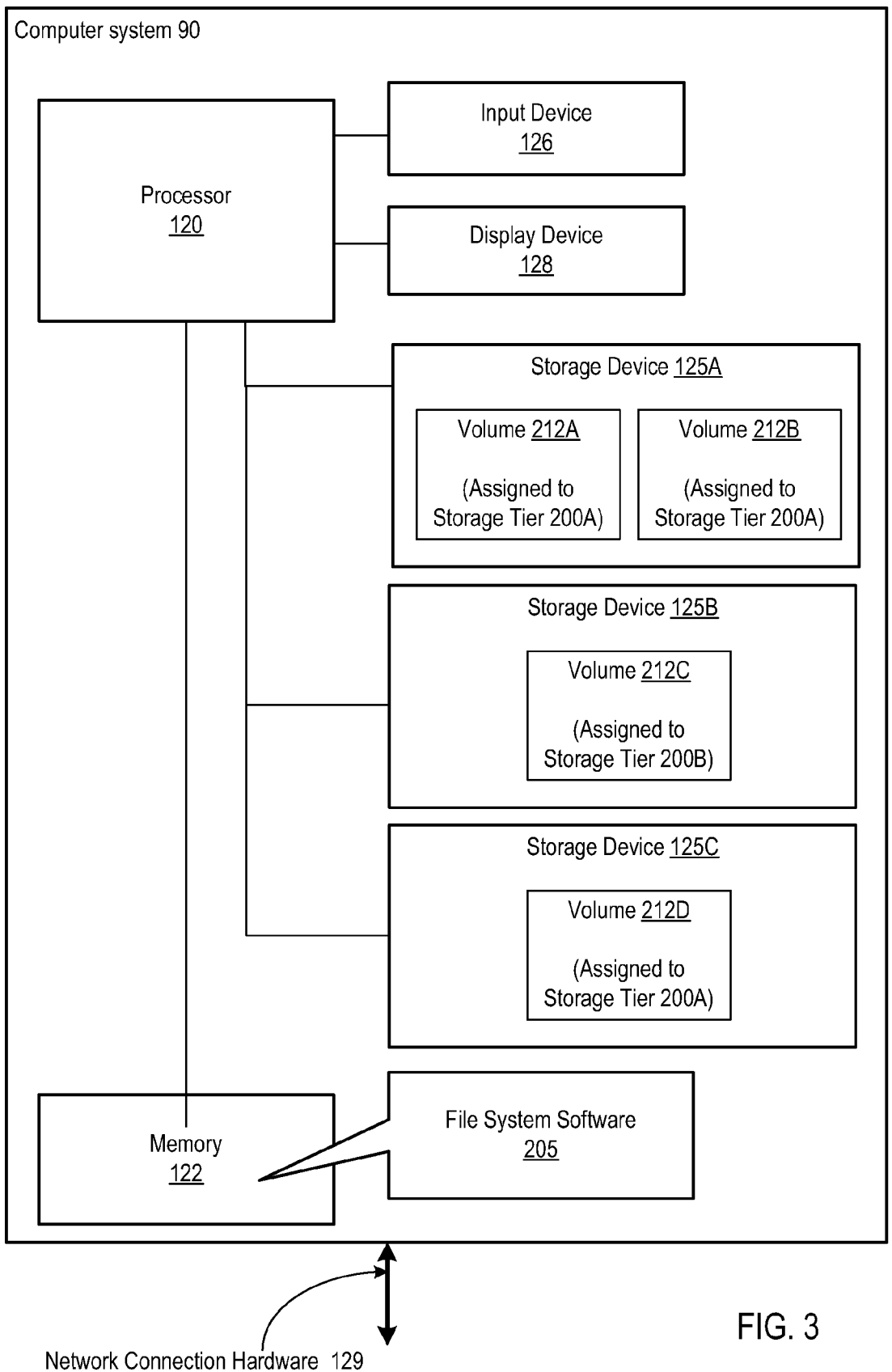
FIG. 3 illustrates another example embodiment of the computer system.

FIG. 3 illustrates another example embodiment of the computer system 90. The computer system 90 may include similar components as described above with reference to FIG. 2, such as one or more processors 120, memory 122 which stores file system software 205, one or more storage devices 125, one or more input devices 126, one or more display devices 128, and network connection hardware 129.

In some embodiments the file system software 205 may utilize a plurality of logical volumes 212, where each volume 212 includes storage of one or more storage devices 125. Each volume 212 may be assigned to a storage tier 200 (e.g., storage tier 200A or 200B in this example). Thus, in the example of FIG. 3, the storage tiers 200 represent groupings of volumes 212. In particular, the volumes 212A, 212B, and 212D are assigned to the storage tier 200A, and the volume 212C is assigned to the storage tier 200B.

In various embodiments, any number of volumes 212 and any number of storage devices 125 may be present. Also, any number of storage tiers 200 may be defined, and the volumes 212 may be assigned to the storage tiers 200 according to any desired criteria. In some embodiments, different volumes on a single storage device 125 may be assigned to different storage tiers 200.

The one or more processors 120 may execute the file system software 205 to implement one or more file systems which manage files stored in the volumes 212. The file system software 205 may also be executable to perform the method described herein for performing a file system operation on a specified storage tier.

Figure 4:
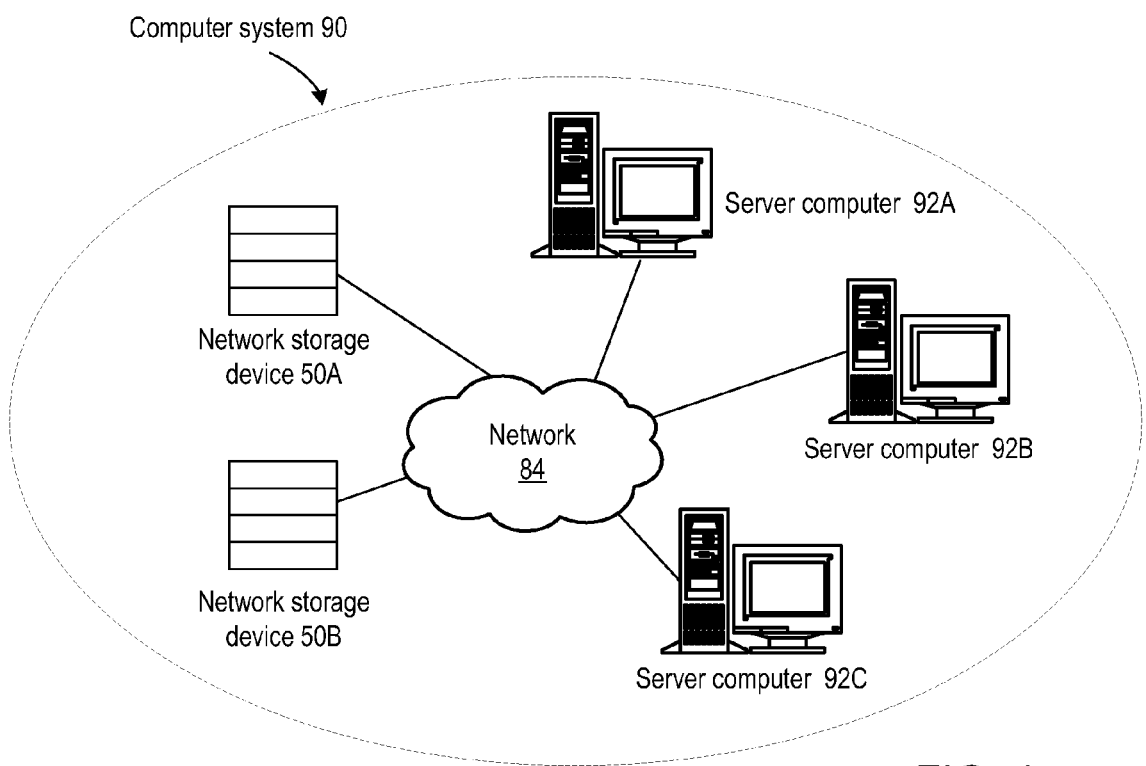
FIG. 4 illustrates an embodiment in which the computer system includes three server computers.

In various embodiments, the computer system 90 may include any number of computers, e.g., one or more. In some embodiments the computer system 90 may include multiple computers. Thus, in some embodiments the functions of the computer system 90 may be distributed across the multiple computers. For example, FIG. 4 illustrates an embodiment in which the computer system 90 includes three server computers 92A, 92B, and 92C. In some embodiments, the file system software 205 may be distributed across the three server computers 92, e.g., such that each server computer 92 executes a respective instance of the file system software 205 or a respective portion of the file system software 205.

The server computers 92 may be connected through a network 84. In some embodiments, one or more of the server computers 90 may access one or more storage devices 125 through the network 84. For example, in FIG. 4, one or more of the storage devices 125 may be included in the network storage devices 50A or 50B.

Figure 5:
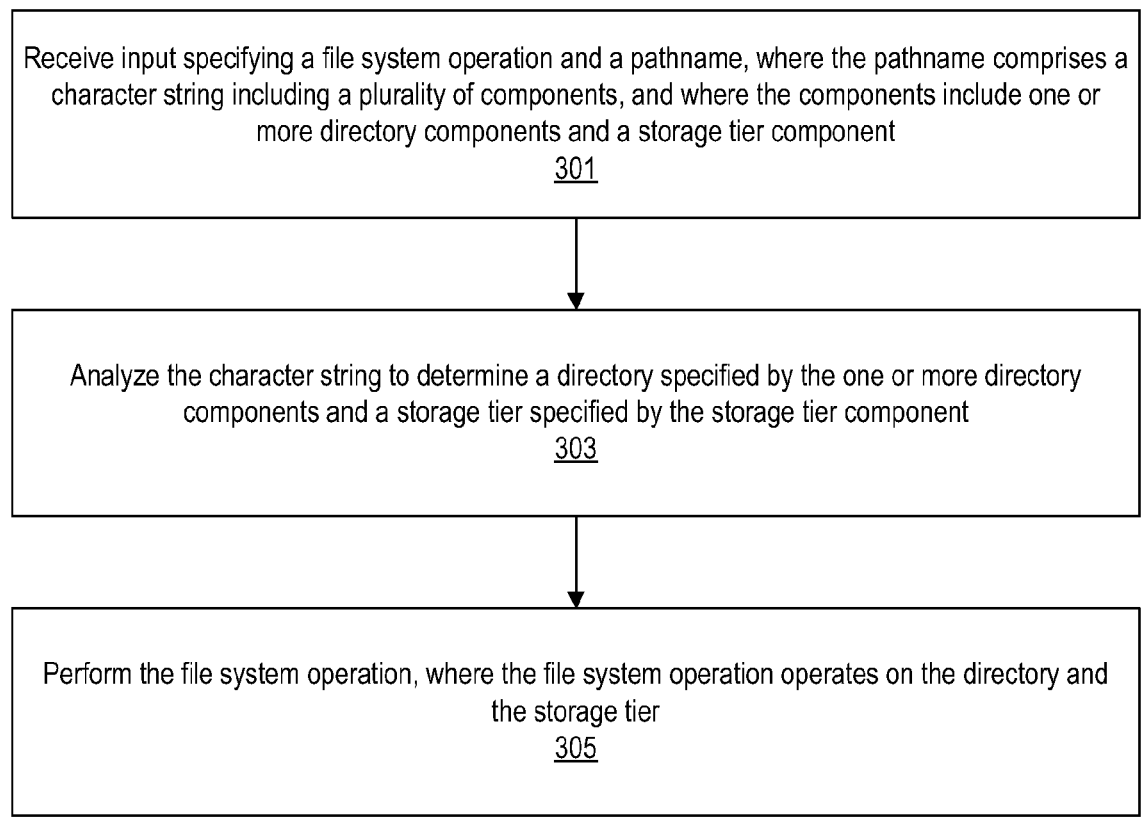
FIG. 5 illustrates one embodiment of a method for performing a file system operation on a specified storage tier.

Referring now to FIG. 5, one embodiment of a method for performing a file system operation on a specified storage tier is illustrated. The method may be performed by the file system software 205 executing on the computer system 90.

As indicated in block 301, input specifying a file system operation and a pathname may be received. In various embodiments the input may specify any of various kinds of file system operations. Examples of file system operations include: operations that list files in a directory, operations that create a new file, operations that copy a file, operations that modify a file, operations that move a file from one directory to another, operations that rename a file, operations that change one or more properties of a file, operations that display a file, etc.

As used herein, the term "pathname" refers to information that specifies a directory and/or a file in a file system. The pathname specified by the input may include a plurality of components. For example, in some embodiments, the pathname may comprise a character string, where each component is a sub-string of the character string. The components may include one or more directory components and a storage tier component. The one or more directory components may specify a directory in the file system, e.g., a directory on which the file system operation should operate. The storage tier component may specify a storage tier on which the file system operation should operate.

In some embodiments, the pathname may comprise a character string, and the components of the character string may be separated by a separator character. In some embodiments the storage tier component may be located after the one or more directory components in the character string. In other embodiments the storage tier component may be located before the one or more directory components in the character string.

In some embodiments the pathname specified by the input may appear similar to a Unix-style pathname, but may also include a storage tier component. For example, in some embodiments the pathname may be a character string of the form:

/dir1/dir2/st=tier_A

In this example, "dir1" and "dir2" are directory components, and "st=tier_A" is the storage tier component. The components in the pathname are separated from each other by a "/" separator character. The directory components specify a directory in a directory hierarchy of the file system, e.g., where the directory components are specified in a hierarchical order according to the directory hierarchy. In this example, the directory components taken together hierarchically specify a directory named "dir2", where the "dir2" directory is a sub-directory of the "dir1" directory. The storage tier component specifies a storage tier defined by the system, e.g., by specifying a name or identifier of a particular storage tier. In this example, the storage tier component specifies a storage tier named "tier_A".

In other embodiments the pathname may be a character string of the form:

st=tier_A/dir1/dir2

In this example, the same directory is specified by the path of directory components (i.e., the "dir2" directory), but the storage tier component is located before the directory components. In some embodiments the file system software 205 may enable the pathname to be entered in either manner, e.g., with the storage tier component either before or after the directory components.

It is noted that the above pathnames are given as examples, and in various embodiments the pathname may have any of various other forms. In particular, the storage tier component of the pathname may have forms other than the form "st=tiername".

In some embodiments the input received in 301 may be received as user input. For example, in some embodiments the user input may be received by the file system software 205 through a user interface, such as an operating system user interface. For example, in some embodiments the user may enter the input as text to an operating system command-line interface or other user interface which enables the user to specify file system operations, such as various file system commands. In such an embodiment, both the file system operation and the pathname may be specified as character strings.

In other embodiments the input 301 may be received by the file system software 205 through various types of interfaces other than a user interface. For example, in some embodiments the input may be passed to the file system software 205 through a programming interface. As one example, a user application or program may pass the input to the file system software 205 through a library call, such as a function call, method call, etc. For example, in some embodiments the library call may correspond to or specify a particular file system operation, and the pathname may be passed as a parameter in the library call. As another example, a system-level application or program may pass the input to the file system software 205 through a system call. As another example, one module of the file system software 205 may pass the input to another module of the file system software 205 by invoking a particular file system operation and passing the pathname as a parameter.

As indicated in 303, the method may further comprise analyzing the pathname to determine the directory specified by the one or more directory components and the storage tier specified by the storage tier component. For example, where the pathname comprises a character string, the character string may be analyzed by parsing the string to determine its separate components. In the above examples, the separate components may be determined by searching for the "/" character as a separator character between different components. In these examples, the storage tier component may be identified by determining which component begins with the characters "st=". The name of the storage tier may be determined as the portion of the storage tier component following the characters "st=". Thus, the storage tier specified by the storage tier component may be identified as the storage tier having the specified storage tier name. The directory specified by the directory components may be identified as the directory hierarchically specified by the one or more directory components.

As indicated in 305, the method may further comprise performing the file system operation, where the file system operation operates on the directory and storage tier specified in the pathname. The file system operation may operate on the directory and the storage tier in any of various ways, e.g., depending on the type of file system operation. For example, the storage tier may indicate a storage tier context in which to perform the file system operation on the specified directory.

Figure 6:
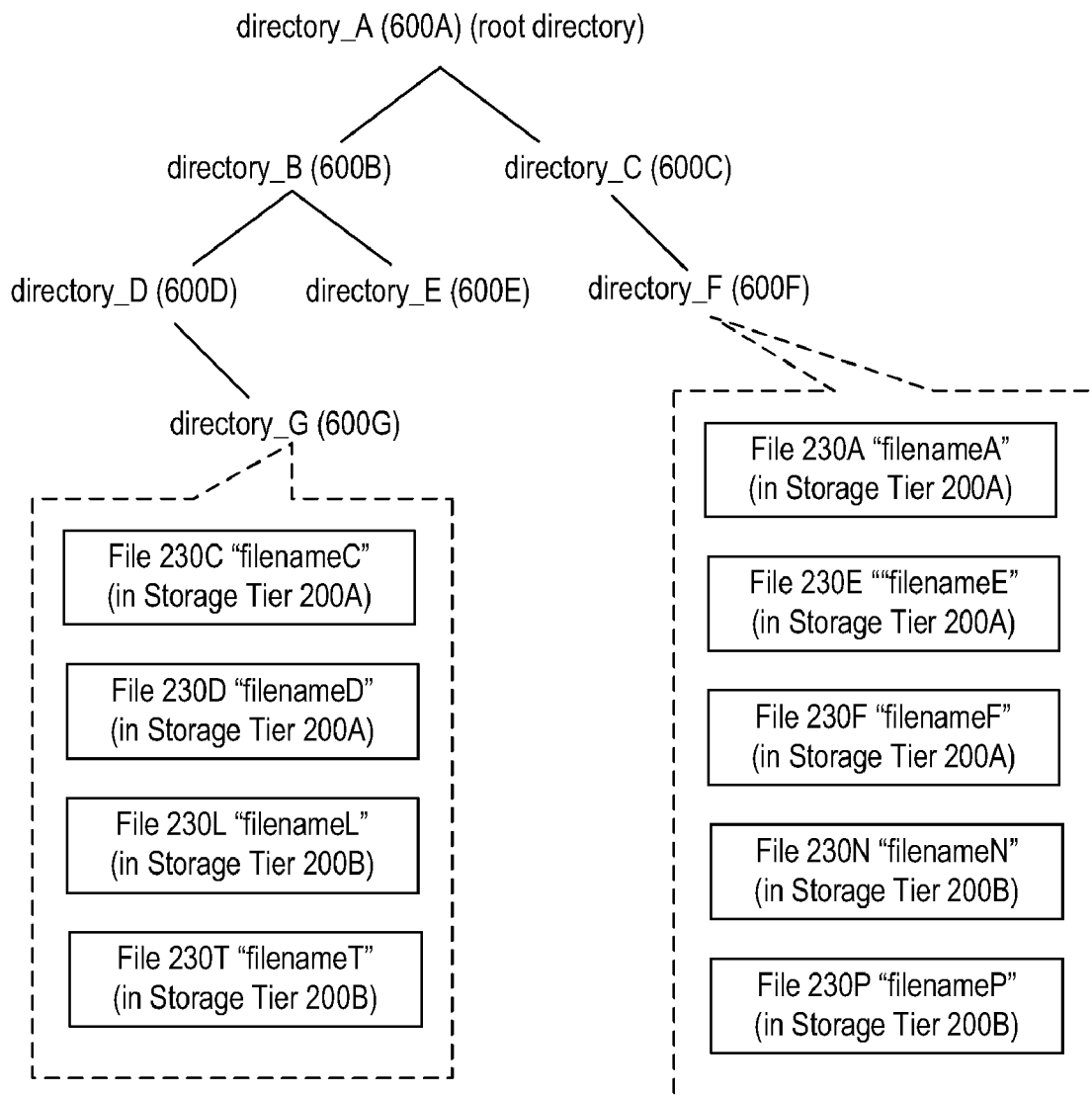
FIG. 6 illustrates a directory hierarchy or tree in which various directories are hierarchically organized.
Figure 7:
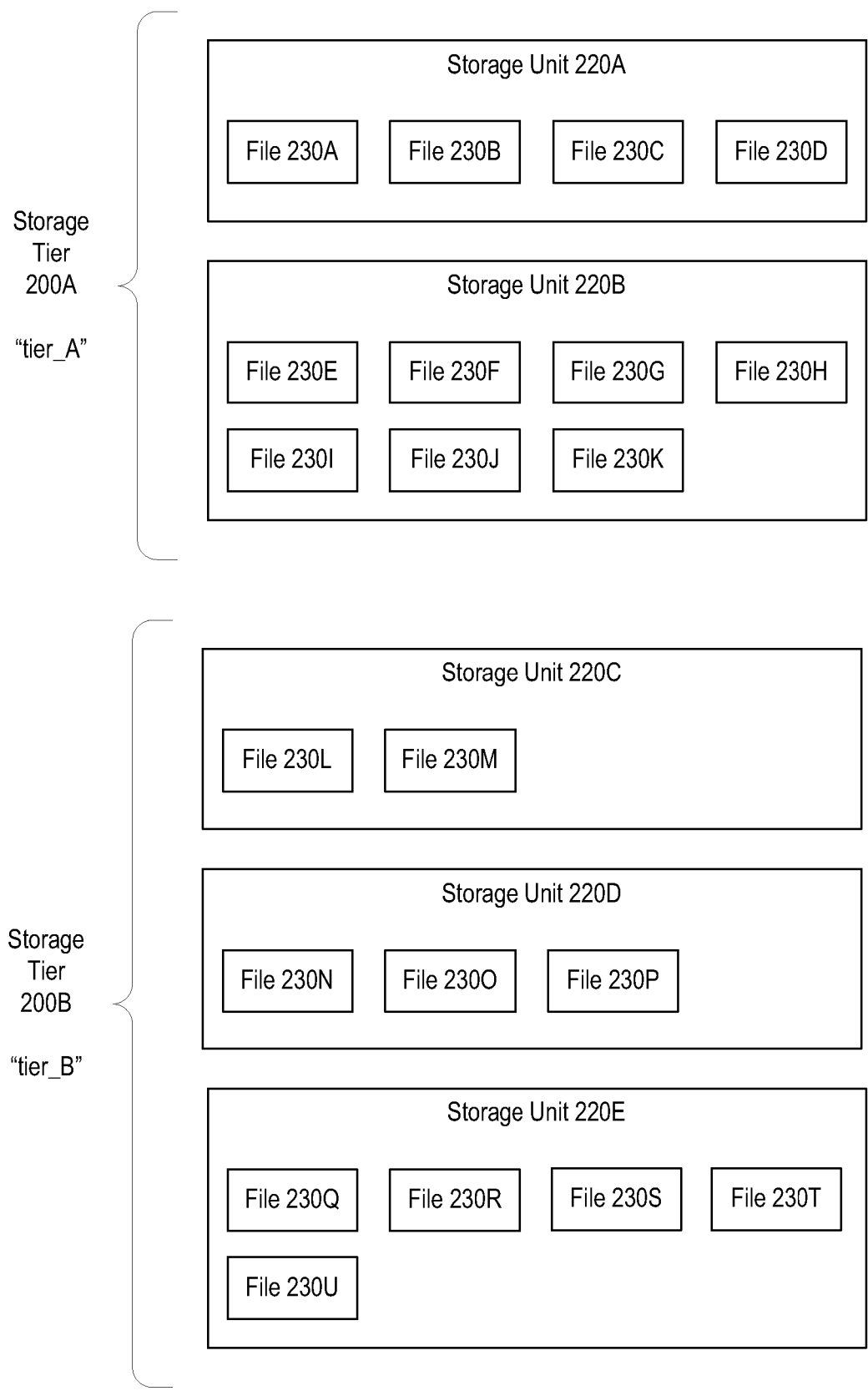
FIG. 7 illustrates an example in which the system includes five storage units grouped into two storage tiers.
Figure 8:
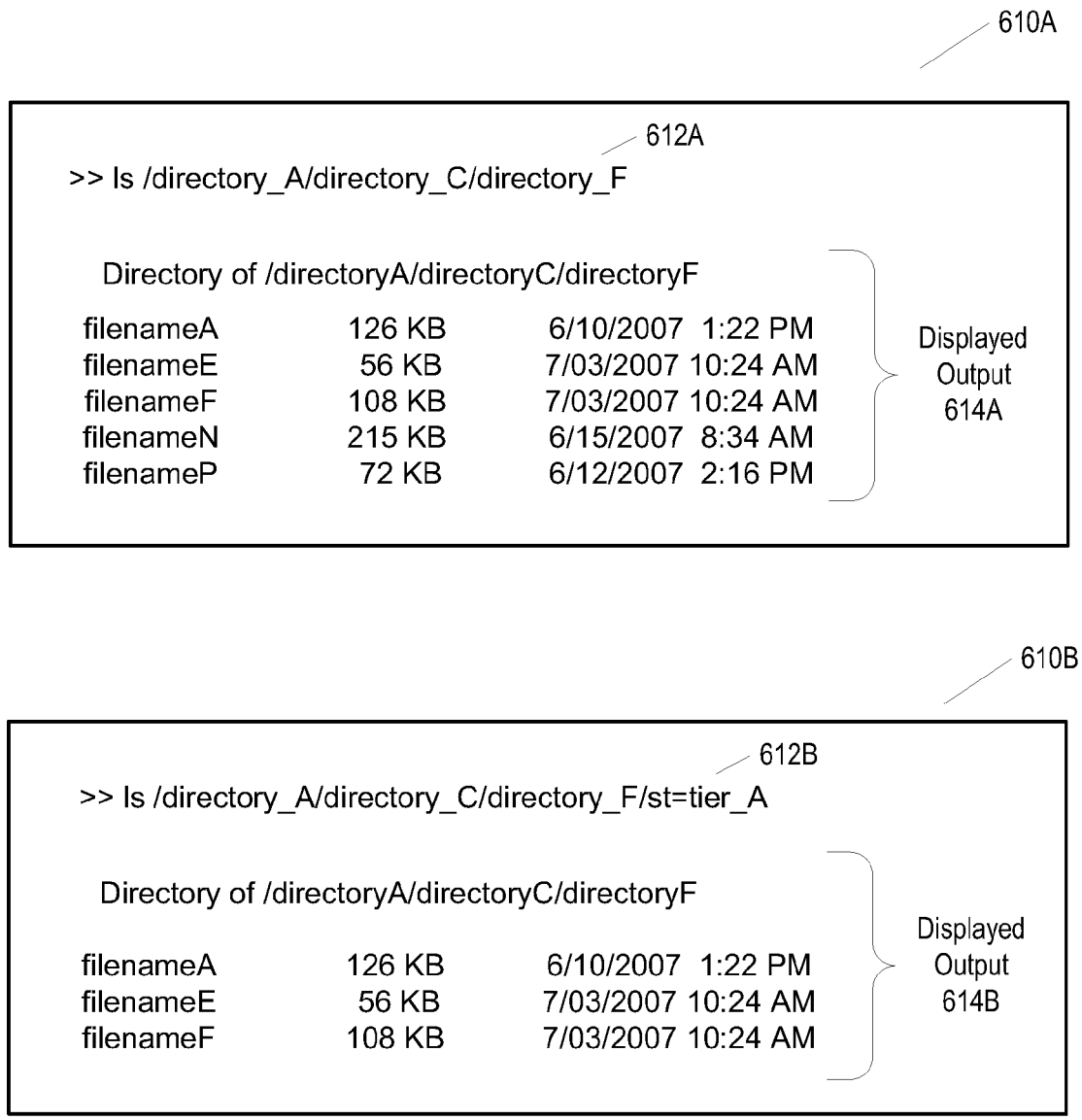
FIG. 8 illustrates an example of a user requesting a file system operation to be performed on a pathname, where the pathname includes a storage tier component.

As an illustration, consider the example shown in FIGS. 6-8. Suppose that the system includes two storage tiers 200A and 200B. Each file 230 of a plurality of files 230 may be assigned to one of these two storage tiers. As shown in FIG. 6, the file system includes a directory hierarchy or tree in which various directories 600 are hierarchically organized. For example, the directory hierarchy includes a root directory 600A named "directory_A", a directory 600B named "directory_B" which is a sub-directory of the root directory 600A, a directory 600D named "directory_D" which is a sub-directory of the directory 600B, etc. Each of the files 230 illustrated in FIG. 6 is included in a directory in the directory hierarchy. For example, the files 230C, 230D, 230L, and 230T are included in the directory 600G named "directory_G", and the files 230A, 230E, 230F, 230N, and 230P are included in the directory 600F named "directory_F". (For simplicity of the diagram, files 230 in the other directories are not shown.) FIG. 6 also indicates which storage tier each of the files 230 in the directories 600F and 600G is assigned to. For example, the files 230C and 230D in the directory 600G and the files 230A, 230E, and 230F in the directory 600F are assigned to the storage tier 200A. The files 230L and 230T in the directory 600G and the files 230N and 230P in the directory 600F are assigned to the storage tier 200B.

For example, FIG. 7 illustrates an embodiment in which the system includes five storage units 220A-220E, e.g., where the storage units are either storage devices or volumes in which various files 230 are stored. The storage units 220A and 220B are assigned to the storage tier 200A having the name "tier_A". The storage units 220C, 220D, and 220E are assigned to the storage tier 200B having the name "tier_B". As illustrated, the files 230A, 230C, and 230D are stored in the storage unit 220A, and the files 230E and 230F are stored in the storage unit 220B. Thus, each of the files 230C, 230D, 230A, 230E, and 230F is stored in a storage unit 220 assigned to the storage tier 200A. Similarly, each of the files 230L, 230T, 230N, and 230P is stored in a storage unit 220 assigned to the storage tier 200B. For example, as illustrated in FIG. 7, the file 230L is stored in the storage unit 220C, the files 230N and 230P are stored in the storage unit 220D, and the file 230T is stored in the storage unit 220E.

Consider now the example user interfaces 610 illustrated in FIG. 8 in which a user inputs file system commands. In the user interface 610A, the user inputs the string, "ls/directory_A/directory_C/directory_F". In this example, "ls" is a file system command requesting the file system to display a directory listing of the specified directory, "/directory_A/directory_C/directory_F". As illustrated, the file system displays all of the files in the specified directory, i.e., the files 230A, 230E, 230F, 230N, and 230P. (See FIG. 6). In this example, the pathname entered by the user does not include a storage tier component, and the command operates similarly as the "ls" file system command in prior art Unix systems.

In the user interface 610B, however, the user inputs the string, "ls/directory_A/directory_C/directory_F/st=tier_A". Thus, in this example, the pathname entered by the user specifies the storage tier 200A. Thus, the "ls" command in this case operates on both the directory "/directory_A/directory_C/directory_F" and the storage tier 200A. In this case, the specified storage tier gives a contextual meaning to the "ls" command and informs the file system software 205 that only the files in the directory 600F ("/directory_A/directory_C/directory_F") that are assigned to the storage tier 200A should be listed. Thus, as indicated in the displayed output 614B, only the files 230A, 230E, and 230F (which are assigned to the storage tier 200A) are shown, and the files 230N and 230P (which are assigned to the storage tier 200B) are not shown.

Figure 9:
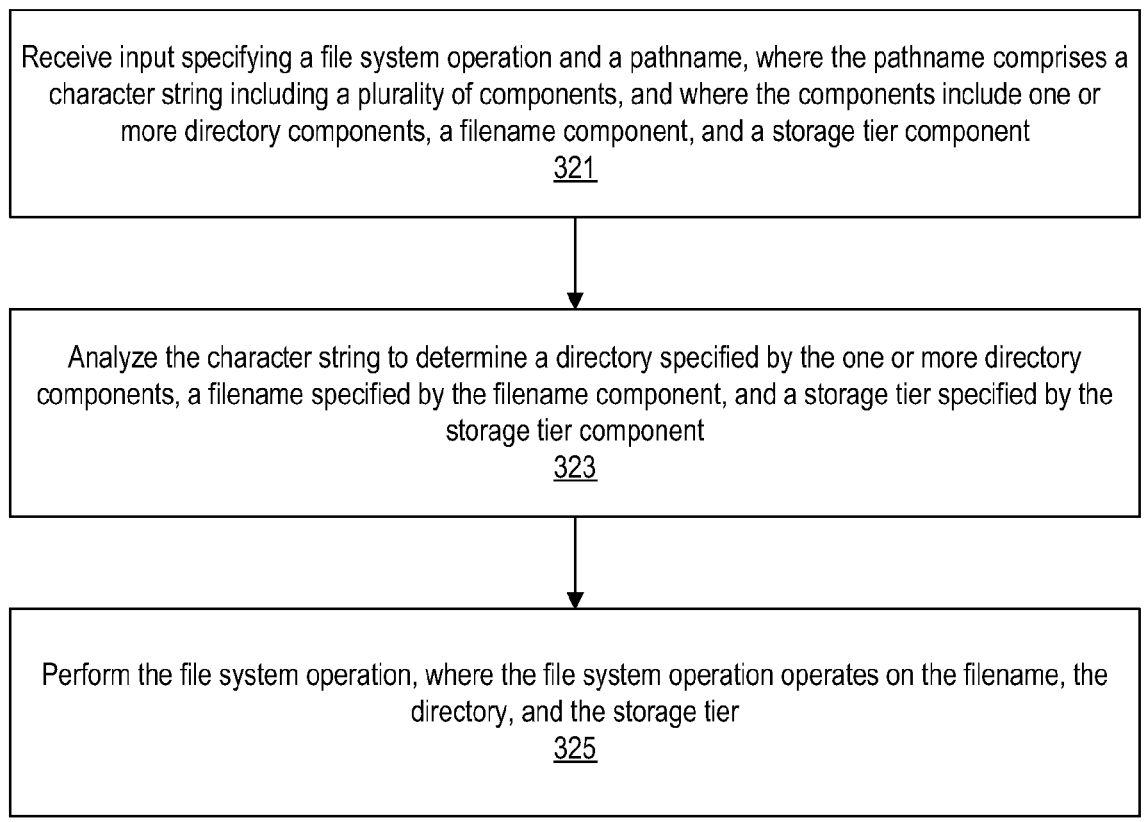
FIG. 9 illustrates another embodiment of the method for performing a file system operation on a specified storage tier.

FIG. 9 illustrates another embodiment of the method for performing a file system operation on a specified storage tier.

In 321, input specifying a file system operation and a pathname is received, where the pathname includes a plurality of components. The components include one or more directory components, a filename component, and a storage tier component.

In 323, the pathname is analyzed to determine a directory specified by the one or more directory components, a filename specified by the filename component, and a storage tier specified by the storage tier component.

In 325, the file system operation is performed, where the file system operation operates on the filename, the directory, and the storage tier.

Thus, the method of FIG. 9 operates similarly as the method of FIG. 8, but in this embodiment the pathname specified in the input also includes a filename. One example of a pathname including one or more directory components, a filename component, and a storage tier component is a string of the form:

/dir1/dir2/st=tier_A/filename

Another example of a pathname including one or more directory components, a filename component, and a storage tier component is a string of the form:

st=tier_A/dir1/dir2/filename

The file system operation may operate on the filename, the directory, and the storage tier in any of various ways, e.g., depending on the type of file system operation. For example, the storage tier may indicate a storage tier context in which to perform the file system operation on the specified file in the specified directory. As one example, the file system operation may operate to create a file having the specified filename in the specified directory such that the newly created file is assigned to the specified storage tier.

Figure 10:
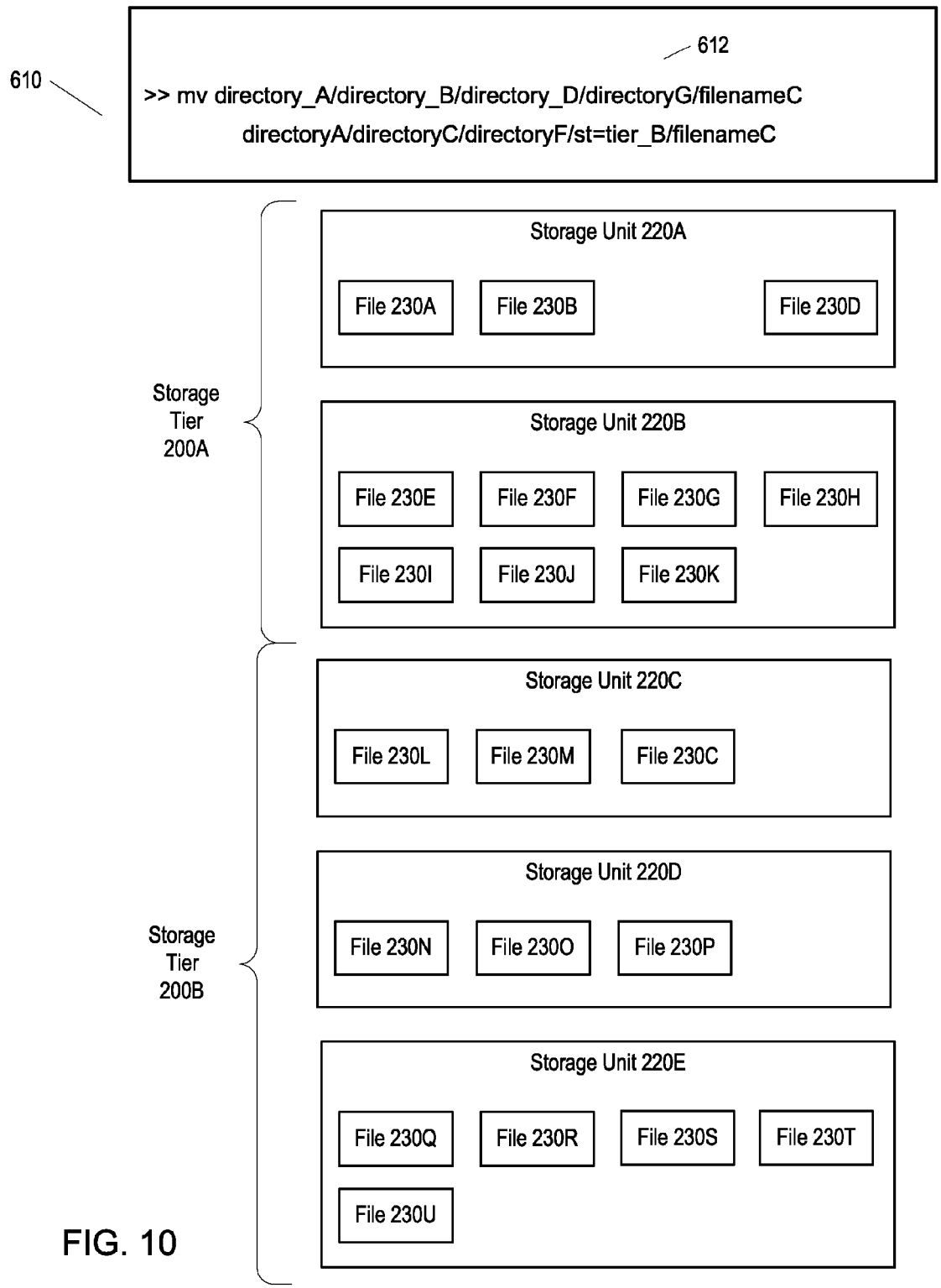
FIGS. 10 and 11 illustrate additional examples of a user requesting a file system operation to be performed on a pathname, where the pathname includes a storage tier component.

As an illustration, consider the example shown in FIG. 10. Suppose that the system is configured as described above with reference to FIGS. 6 and 7. As indicated in the user interface 610, the user enters the text 612:

mv/directory_A/directory_B/directory_D/directoryG/filenameC/directoryA/directoryC/directoryF/st=tier_B/filenameC The specified text indicates that the user wants the file 230C (named "filenameC") in the directory 600G (named "/directory_A/directory_B/directory_D/directoryG") to be moved to the directory 600F (named "/directoryA/directoryC/directoryF") and to be assigned to the storage tier 200B (named "st=tier_B"). Thus, in performing the command, the file system software 205 moves the file 230C from the directory 600G to the directory 600F. Since the file 230C was previously assigned to the storage tier 200A, the file system software 205 also re-assigns the file 230C to the storage tier 200B. In re-assigning the file 230C to the storage tier 200B, the file system software 205 may move the file from the storage unit 220A to one of the storage units 220 assigned to the storage tier 200B. For example, in FIG. 10 the file 230C has been moved to the storage unit 220C. Thus, for example, in an embodiment in which the storage tiers 200 represent groupings of storage devices 125, the file system software 205 may move the file 230C from one storage device 125 to another. Similarly, in an embodiment in which the storage tiers 200 represent groupings of volumes 212, the file system software 205 may move the file 230C from one volume 212 to another.

Figure 11:
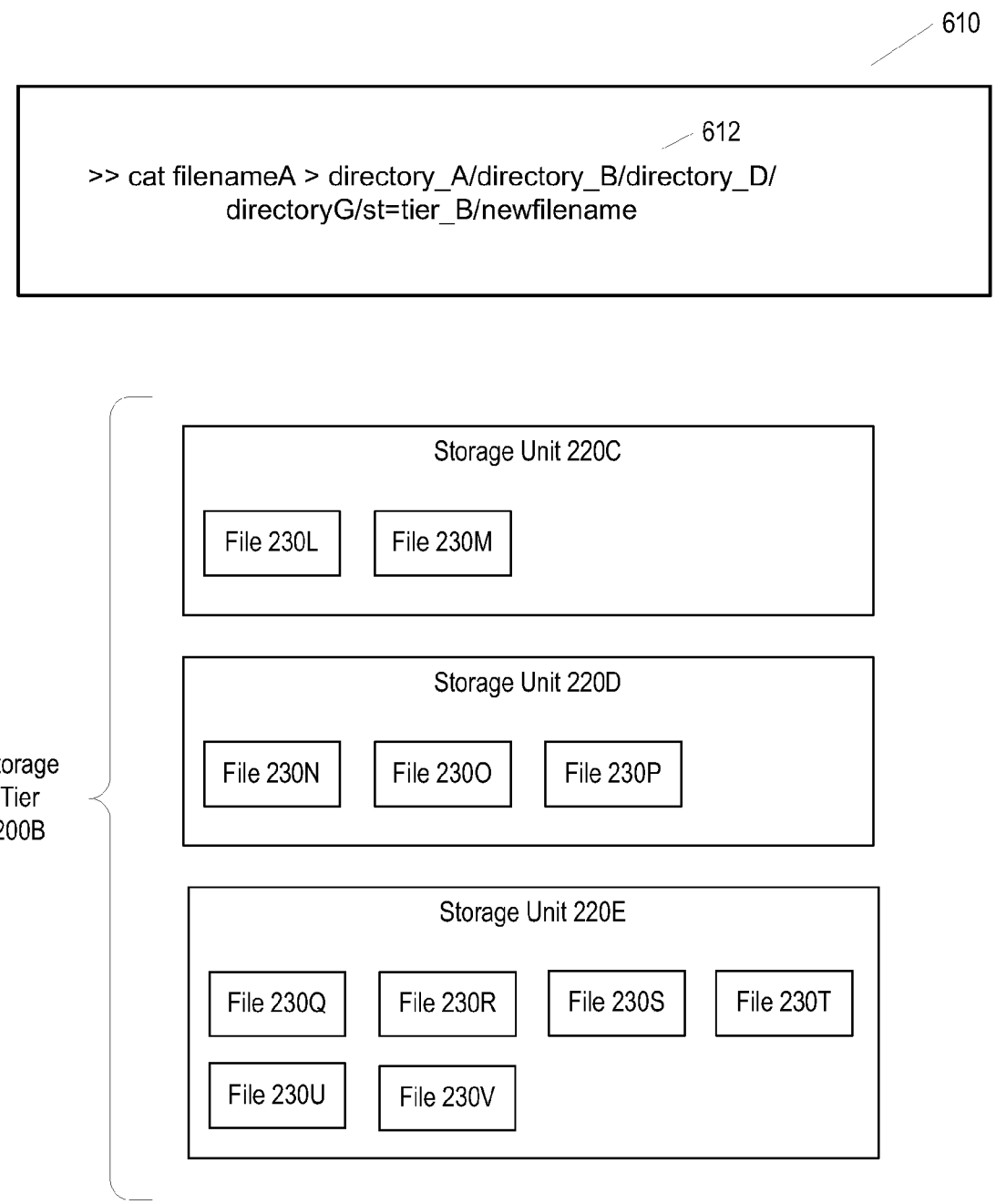

FIG. 11 illustrates another example in which a file system command operates on a specified filename, directory, and storage tier. In this example, the user navigates to the directory 600F and then enters the following text 612:

cat filenameA>/directory_A/directory_B/directory_D/directoryG/st=tier_B/newfilename The specified text indicates that the user wants the data from the file 230A (named "filenameA") to be piped into a new file named "newfilename", where the new file is created in the directory 600G (named "/directory_A/directory_B/directory_D/directoryG"), and where the new file is assigned to the storage tier 200B (named "tier B"). Thus, the file system software may create a new file 230V in the directory 600G with the data from the file 230A and assign the new file 230V to the storage tier 200B. Since the new file 230V is assigned to the storage tier 200B, the file may be stored in one of the storage units 220C, 220D, or 220E. For example, in FIG. 11 the new file 230V has been stored in the storage unit 220E.

In another embodiment of the method, the input to the file system software 205 may specify both a first pathname and a second pathname. The first pathname may comprise a first character string including one or more directory components, a filename component, and a storage tier component. The second pathname may comprise a second character string including one or more directory components and a filename component. The first pathname and the second pathname may be specified in either order. In this embodiment the file system operation may operate on the first filename, the first directory, the second filename, the second directory, and the storage tier. In a further embodiment the second pathname may also include a storage tier, and the method may operate on first filename, the first directory, the second filename, the second directory, the first storage tier, and the second storage tier.

For example, in one embodiment the user may enter the text:

mv/dir1/dir2/st=tiername1/*.txt
/dir3/st=tiername2

In this example, the filename in the first pathname is given as a wildcard ("*.txt"). In processing this command, the file system software 205 may move each file in the directory "/dir1/dir2" that is assigned to the storage tier "tiername1" and has an extension of ".txt" to the directory "/dir3" and re-assign the file to the storage tier "tiername2".

Thus, in some embodiments, storage tier information may be integrated with the file system's namespace, e.g, such that a user or application can request file system commands or file system operations to be performed in the context of a particular storage tier by specifying the particular storage tier as a component in a pathname.

A pathname of the form "/dir1/dir2/st=tiername" is also referred to herein as a storage tier directory, since this pathname has an appearance is if there were a sub-directory named "st=tiername" of the directory "/dir1/dir2". However, in some embodiments, there may not be an actual directory named "st=tiername" in the directory hierarchy. For example, as described above, the user may enter command-line text, such as, "ls/dir1/dir2/st=tiername". Rather than retrieving the file listing from an actual directory named "st=tiername", the file system software 205 may dynamically generate the listing of files, e.g., by analyzing the directory information for the "/dir1/dir2" directory and/or by analyzing file information for files stored in this directory to determine which of the files are assigned to the specified storage tier.

In some embodiments the user may be operable to change the current directory to move into a storage tier directory, even if the storage tier directory does not exist as an actual directory in the directory hierarchy. For example, the user may enter command-line text, such as "cd/dir1/dir2/st=tiername" to change the current directory to the specified storage tier directory. If the user then enters the command-line text "ls", the file system may display only the files in the directory "/dir1/dir2" that are assigned to the storage tier named "tiername", similarly as if the user had typed, "ls/dir1/dir2/st=tiername".

As another example, storage tier directories may be made visible to the user at the mount point level. For example, the user may mount the file system as "/st=t1" and enter the command-line text, "cd/st=t1/dir1". If the user then enters the command-line text "ls", the file system may display only the files in the directory "/dir1" that are assigned to the storage tier named "t1". If the user then navigates down to a sub-directory of "dir1", e.g., by entering "cd dir2", the storage tier context may be maintained. For example, if the user then enters "ls" again, the file system may display only the files in the directory "/dir1/dir2" that are assigned to the storage tier named "t1". Similarly, if the user specifies another type of file system command without specifying an absolute path then the command may operate on only the files in the current directory that are assigned to the storage tier named "t1".

For storage tier directories specified at the mount point level, the storage tier context information may be stored so that it can be efficiently obtained when needed to determine the storage tier context for a file system operation. For example, in some embodiments the storage tier context information may be stored in a super block that includes information about the mounted file system.

In some embodiments, various directory listings for storage tier directories may be pre-computed and cached, e.g., so that they are already available when needed by a file system operation. When a file system modification is made through a storage tier directory, the file system software 205 may modify the file system directory information in the actual directory hierarchy first and then modify the cached directory information for the storage tier directory. This may prevent the storage tier directory information from being ahead of the directory information in the actual directory hierarchy.

In some embodiments, the storage tier information may be stored as meta-data with each file. In other embodiments the storage tier information for each respective file may be stored along with the name of the file in the file's parent directory. This may improve the speed of determining which files in a given directory belong to a given storage tier, since the storage tier information can be obtained from the parent directory, thus avoiding the need to access the meta-data for each file.

In other embodiments the concept of storage tier directories may be extended to include storage tier context information for multiple storage tiers. For example, the user may enter "ls/dir1/dir2/st=(t1 OR t2)" in order to request the file system to display all the files in the directory "/dir1/dir2" that belong to either the storage tier "t1" or the storage tier "t2". As another example, the user may enter "ls/dir1/dir2/st=(NOT t1)" in order to request the file system to display all the files in the directory "/dir1/dir2" that do not belong to the storage tier "t1".

In some embodiments, files may be placed in or migrated to particular storage tiers from a remote machine through a protocol such as NFS or CIFS. For example, a user may specify that a file in a remote file system on a remote machine be migrated to a different storage tier by issuing a "mv" command or other file system operation and a pathname in the remote file system, where the pathname includes a storage tier component.

In various embodiments, integrating storage tier information with the file system's namespace may enable various types of software applications to use storage tier information, where they might not be able to easily do so otherwise. For example, consider a backup software application where a user wants to backup only those files in "/home" that are assigned to a given storage tier "t1". The user may simply request the backup software application to back up the storage tier directory "/st=t1/home" or "/home/st=t1". This may ensure that only the desired files are backed up. Also, the storage tier name may be automatically stored in the form of the directory name. During restore, since the restore pathname is "/st=t1/home", the file system may understand that all these files need to be created in the storage tier "t1". Thus existing backup products may make use of storage tier information without needing significant changes. Similarly, other types of software applications, such as search tools, classification tools, or applications that perform data lifecycle management may easily use storage tier information by utilizing pathnames that include storage tier components, e.g., in order to perform operations such as allocating files on a specified storage tier, listing files in a specified storage tier, re-assigning files to a specified storage tier, etc.

As another example of a potential benefit in some embodiments, suppose that a user or application knows that the desired working set of files belongs to a particular storage tier or set of storage tiers. For example, suppose the user's application requires only files belonging to storage tier "t1" or "t2". Instead of using a traditional working directory such as "/dir1", the user can set the working directory to /st=(t1 OR t2)/dir1". In an embodiment in which the filtering of entries occurs at the directory read level, those files which don't belong to either the storage tier "t1" or "t2" may not occupy unnecessary space in a DNLC cache. Also, cached directory blocks may be generated by the file system so that they occupy less space. From the user's point of view, he may get a better view of his data with a less crowded namespace.

In some embodiments the storage tiers defined for the system may have a hierarchical organization. For example, multiple volumes may form a set, multiple sets may form a tier, multiple tiers may form a class, etc. Such a hierarchy may be incorporated into the system by representing it similarly as a directory tree structure. Thus, for example, if an application wants a file "dir1/file1" to be allocated to class "Gold", tier "t1", volume "v1", the application may specify that it is to be created with the pathname, "class=Gold/tier=t1/volume=v1/dir1/file1". If the application does not care about the exact tier and volume but only the class, the application may instead specify a pathname such as, "class=Gold/dir1/file1".

In some embodiments, the system may be operable to split files across multiple storage tiers. This may be useful, for example, for very large database files. Split files may be handled through a union of storage tiers. For example, if the user wants to specify that the file could be placed partly on either of storage tier "t1" or "t2", the user could qualify the pathname with "st=(t1 OR t2)". The file may be made visible in both the storage tier directories for "t1" and the storage tier directories for "t2". If it is desired for only the file ranges in a given storage tier to be visible then the file names in the corresponding storage tier directories may be formed by appending offset-length combinations to the original filename.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible non-transitory storage medium storing program instructions executable to:
   receive input specifying a file system operation and a first pathname,
   wherein the first pathname comprises a character string,
   wherein the first pathname points to a file,
   wherein the file is assigned to a first storage tier based on an importance level of the file,
   wherein the character string includes a plurality of components, and
   wherein the plurality of components includes one or more directory components and a storage tier component;
   parse the character string to extract the one or more directory components,
   wherein the one or more directory components specify a first directory, and
   the first directory includes a plurality of files assigned to a first storage tier and a plurality of files assigned to a second storage tier;
   parse the character string to extract the storage tier component,
   wherein the storage tier component specifies the first storage tier,
   wherein the first storage tier specified by the storage tier component is identified by a storage tier name, and
   wherein the storage tier name is determined by a portion of the storage tier component following a storage tier identifier in the character string; and
   perform the file system operation, wherein the file system operation operates on the first directory and the first storage tier,
   wherein the file system is operable to split the file across the first storage tier and a second storage tier, and
   the file system operates on the union of the first storage tier and the second storage tier as specified in the storage tier component of the character string.

2. The computer-accessible non-transitory storage medium of claim 1,
   wherein the first storage tier represents a grouping of a plurality of storage units, wherein the file system operation operates on one or more of the storage units in the first storage tier.

3. The computer-accessible non-transitory storage medium of claim 2,
   wherein each of the storage units of the first storage tier comprises one of:
   a volume;
   a physical storage device.

4. The computer-accessible non-transitory storage medium of claim 1,
   wherein the first directory includes a plurality of files, wherein each file in the first directory is assigned to one of a plurality of storage tiers, wherein the plurality of storage tiers includes the first storage tier, wherein at least one of the files is assigned to the first storage tier; and
   wherein the file system operation operates to list the files in the first directory that are assigned to the first storage tier.

5. The computer-accessible non-transitory storage medium of claim 1,
   wherein the plurality of components also includes a filename component;
   wherein the first pathname is further analyzed to determine a first filename specified by the filename component; and
   wherein the file system operation operates on the first filename, the first directory, and the first storage tier.

6. The computer-accessible non-transitory storage medium of claim 5,
   wherein the file system operation operates to create a file having the first filename in the first directory such that the file is assigned to the first storage tier.

7. The computer-accessible non-transitory storage medium of claim 5,
   wherein the input also specifies a second pathname, wherein the second pathname includes one or more directory components specifying a second directory and a filename component specifying a second filename;
   wherein the program instructions are further executable to analyze the second pathname to determine the second directory and the second filename;
   wherein the file system operation operates on the first filename, the first directory, the second filename, the second directory, and the first storage tier.

8. The computer-accessible non-transitory storage medium of claim 7,
   wherein the second filename identifies a file in the second directory;
   wherein the file system operation operates to move the file from the second directory to the first directory such that the file is re-named to the first filename and is assigned to the first storage tier.

9. The computer-accessible non-transitory storage medium of claim 1,
   wherein the input is received as user input through an operating system user interface.

10. The computer-accessible non-transitory storage medium of claim 1,
    wherein each of the components of the character string are separated by a separator character.

11. The computer-accessible non-transitory storage medium of claim 1,
    wherein the storage tier component is located after the one or more directory components in the character string.

12. The computer-accessible non-transitory storage medium of claim 1, wherein the storage tier component is located before the one or more directory components in the character string.

13. A system comprising:

one or more processors; and memory storing program instructions, wherein the program instructions are executable by the one or more processors to:

receive input specifying a file system operation and a first pathname, wherein the first pathname comprises a character string, wherein the first pathname points to a file, wherein the file is assigned to a first storage tier based on an importance level of the file, wherein the character string includes a plurality of components, and wherein the plurality of components includes one or more directory components and a storage tier component, parse the character string to extract the one or more directory components, wherein the one or more directory components specify a first directory, parse the character string to extract the storage tier component, wherein the storage tier component specifies the first storage tier, wherein the first storage tier specified by the storage tier component is identified by a storage tier name, and wherein the storage tier name is determined by a portion of the storage tier component following a storage tier identifier in the character string, and perform the file system operation, wherein the file system operation operates on the first directory and the first storage tier, the program instructions executable to perform the file system operation further comprise program operations executable to split the file across the first storage tier and a second storage tier, and the file system operates on the union of the first storage tier and the second storage tier as specified in the storage tier component of the character string.

14. The system of claim 13, wherein the first storage tier represents a grouping of a plurality of storage units, wherein the file system operation operates on one or more of the storage units in the first storage tier.

15. The system of claim 13, wherein each of the storage units of the first storage tier comprises one of:

a volume;

a physical storage device.

16. The system of claim 13, wherein the plurality of components also includes a filename component;

wherein the first pathname is further analyzed to determine a first filename specified by the filename component; and wherein the file system operation operates on the first filename, the first directory, and the first storage tier.

17. A computer-implemented method comprising:

a computer system receiving input specifying a file system operation and a first pathname, wherein the first pathname comprises a character string, wherein the first pathname points to a file, wherein the file is assigned to a first storage tier based on an importance level of the file, wherein the character string includes a plurality of components, wherein the plurality of components includes one or more directory components and a storage tier component;

the computer system parsing the character string to extract the one or more directory components, wherein the one or more directory components specify a first directory, and the first directory contains a plurality of files assigned to a first storage tier and a plurality of files assigned to a second storage tier;

the computer system parsing the character string to extract the storage tier component, wherein the storage tier component specifies the first storage tier, the first storage tier specified by the storage tier component is identified by a storage tier name, and the storage tier name is determined by a portion of the storage tier component following a storage tier identifier in the character string; and the computer system performing the file system operation, wherein the file system operation operates on the first directory and the first storage tier, the file system operation comprises splitting the file across the first storage tier and a second storage tier, and the file system operates on the union of the first storage tier and the second storage tier as specified in the storage tier component of the character string.

18. The computer-implemented method of claim 17, wherein the first storage tier represents a grouping of a plurality of storage units, wherein the file system operation operates on one or more of the storage units in the first storage tier.

19. The computer-implemented method of claim 1, wherein the first directory includes a plurality of files, a first file in the first directory is assigned to the first storage tier, a second file in the first directory is assigned to a second storage tier, the plurality of storage tiers includes the first storage tier and the second storage tier, and the file system operation operates to move the first file from the first storage tier to the second storage tier.

* * * * *